United States Patent [19]
Sullivan

[11] 4,360,122
[45] Nov. 23, 1982

[54] TANK CAP HAVING SEQUENTIAL ENGAGEMENT AND DISENGAGEMENT

[75] Inventor: Herbert D. Sullivan, Chicago, Ill.

[73] Assignee: International Harvester Co., Chicago, Ill.

[21] Appl. No.: 291,535

[22] Filed: Aug. 10, 1981

[51] Int. Cl.³ .................. B65D 41/06; B65D 41/36
[52] U.S. Cl. ............................ 220/295; 220/301; 220/302; 220/DIG. 33; 220/373; 220/374
[58] Field of Search ............... 220/293, 295, 298, 301, 220/302, 373, 374, DIG. 33

[56] References Cited
U.S. PATENT DOCUMENTS

| 1,960,928 | 5/1934 | Stant | 220/295 |
| 3,784,047 | 1/1974 | Cooper | 220/301 |
| 4,081,102 | 3/1978 | Sakai | 220/295 |

Primary Examiner—George T. Hall
Attorney, Agent, or Firm—J. W. Gaines; F. D. DuBuchon

[57] ABSTRACT

A cap for a liquid containing vessel has redundant tang portions for engagement with closure ramps of a host tank access filler tube. Sealing engagement between the cap and the filler tube cap retention ramps is enhanced through the utilization of pitched guide surface inclines on one of the tang elements.

8 Claims, 8 Drawing Figures

U.S. Patent  Nov. 23, 1982  Sheet 1 of 3  4,360,122
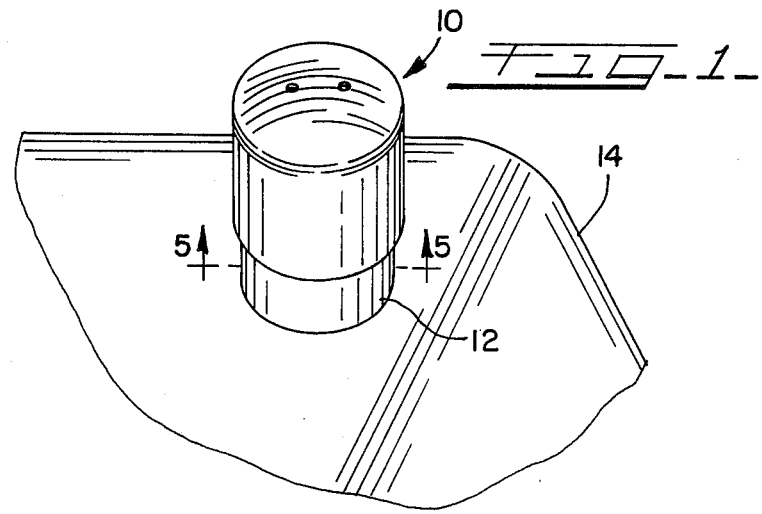
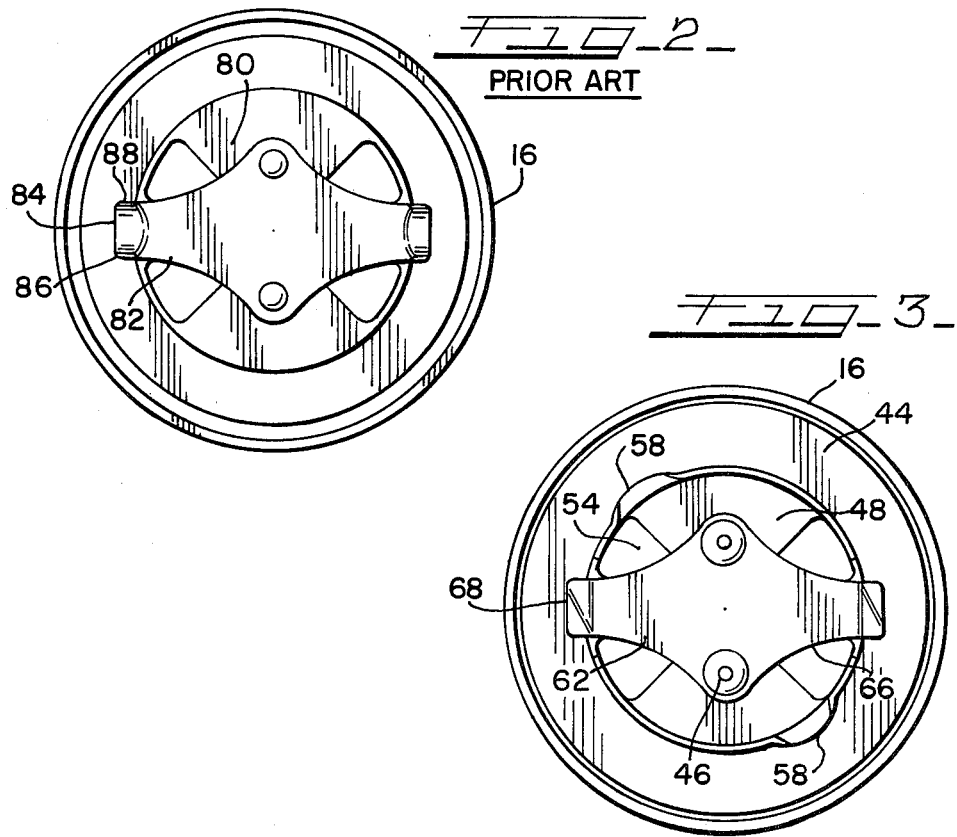

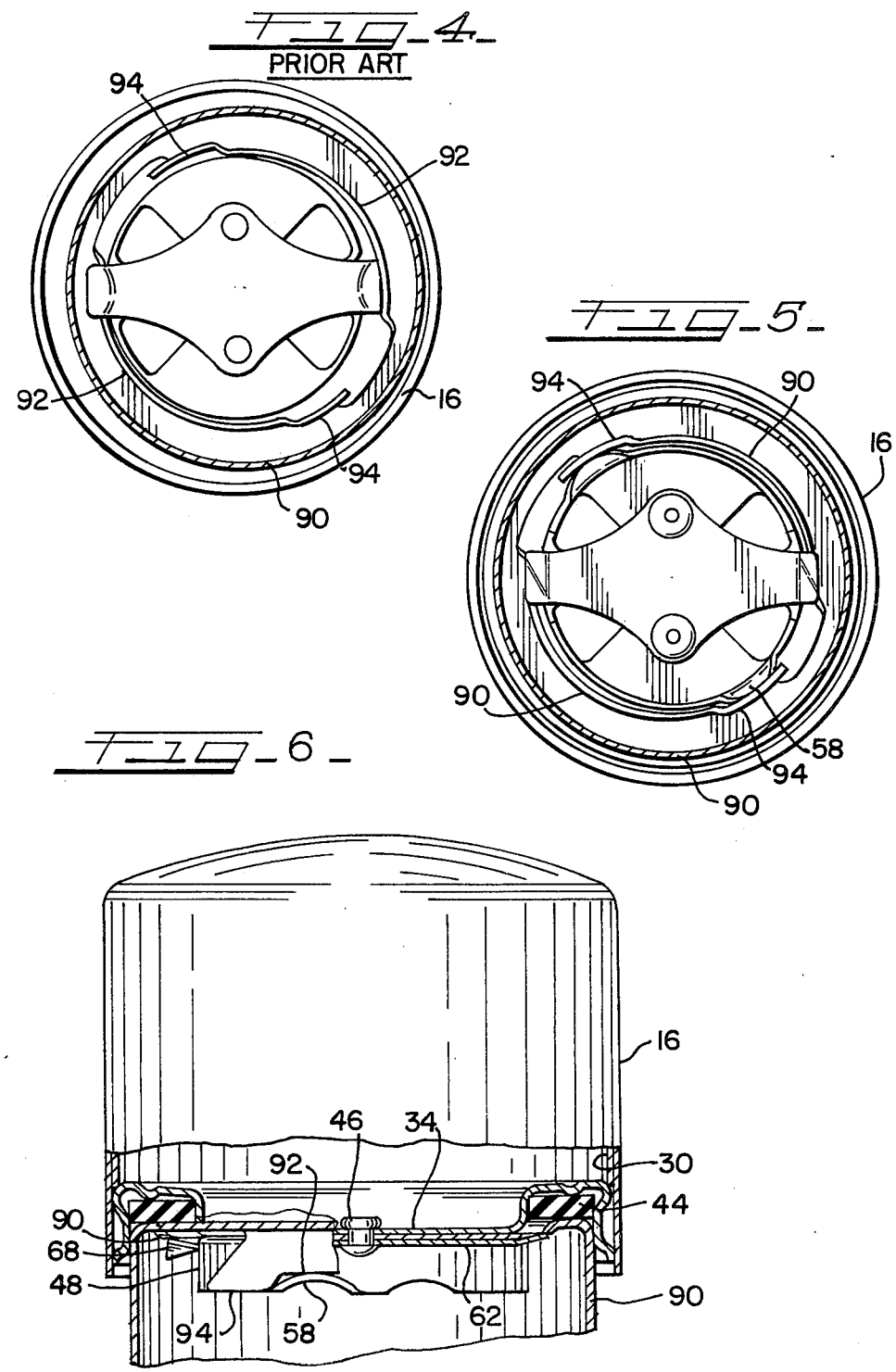

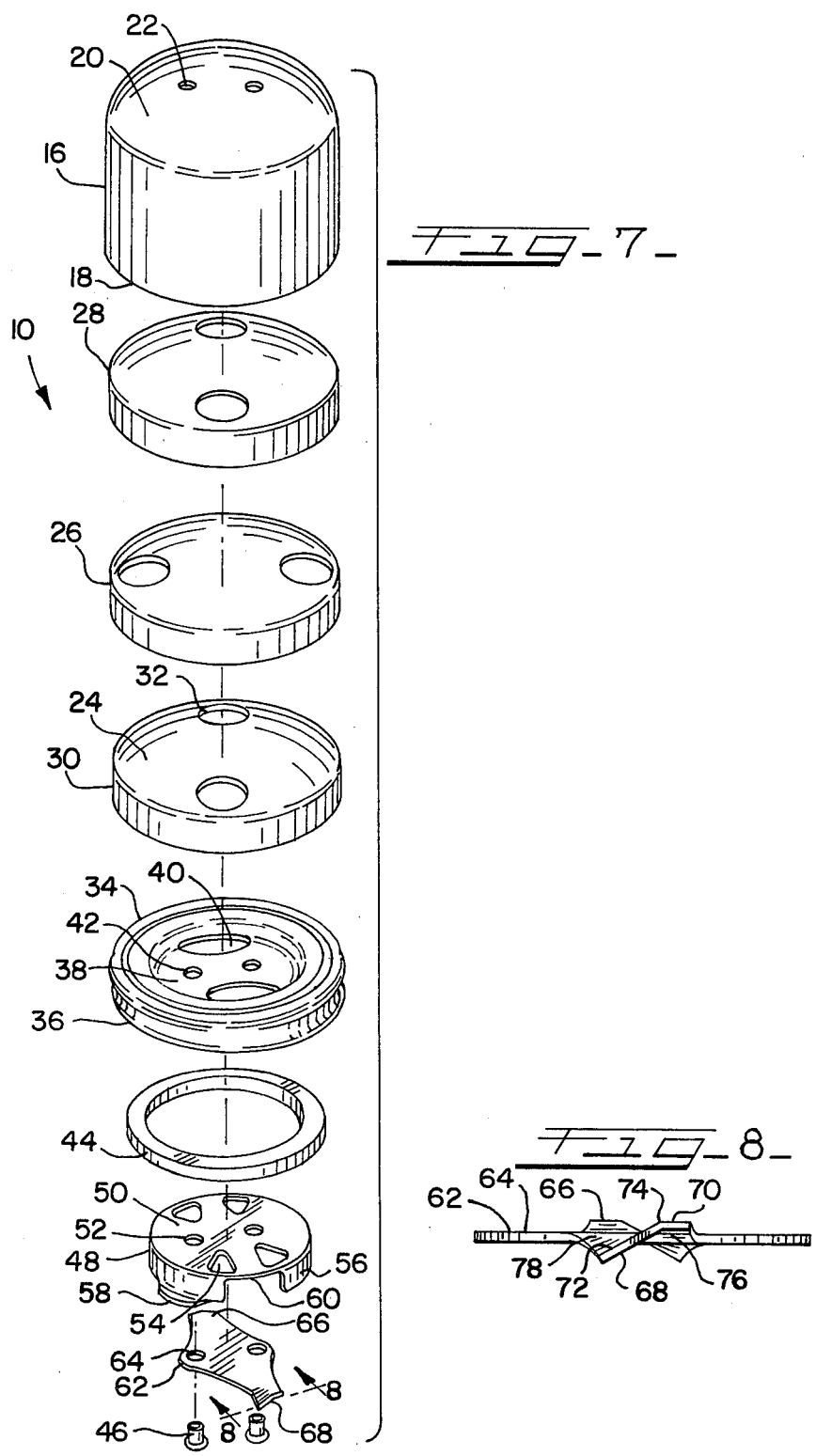

TANK CAP HAVING SEQUENTIAL ENGAGEMENT AND DISENGAGEMENT

BACKGROUND OF THE INVENTION

1. Field of the Invention

This invention concerns tank caps for fluid containers. Specifically, a tank cap is provided with tang elements for engagement with a tank filler neck. A plurality of tang elements are divided into two pairs. One pair of tang elements will make contact with the filler neck prior to engagement of the second set. Therefore, sequential engagement and disengagement will be possible assisting in cap and filler neck alignment.

2. Description of the Prior Art

Cap design for use in combination with fuel tanks of agricultural tractor vehicles generally incorporate a vented cap having a single tang member comprising a spring-like elongated member having first and second end portions. The filler neck to which the cap would be attached would be provided with internal inclined ramps progressing from the top of the filler neck inwardly a short distance for increasing the seal pressure of the cap on the filler neck as the cap is rotated or generally screwed into place on the filler neck.

The filler necks are sometimes abused in service by vehicle operators and servicing personnel. Occasionally, large fluid storage cans are used in the refilling operation and if a heavy storage can is rested on the edge of a large funnel inserted into the filler neck during filling the internal inclined ramps in the filler neck can be distorted and bent inwardly causing the inside diameter to be expanded. The conventional cap with its single tang member may not engage the inclined ramps (or cam surfaces) properly if the filler neck has been damaged in this manner. The cap could end up being uncentered resulting in one tang end portion missing the inclined ramp surface. Upon further rotation of the cap by the operator the tang end that missed the inclined ramp will, instead of riding up the inclined ramp, cut into the interior sidewall surface of the inclined ramp. In this partial engagement the cap will be held in place by tang spring force from only the properly engaged tang portion. The cap may appear to be tight due to the friction of the unengaged tang end that missed the inclined surface of the ramp and was forced to cut into the interior sidewall surface of the inclined ramp.

The cap presented in this specification incorporates a "self-threading" feature in its tang element design such that if one tang end misses the inclined ramp on an enlarged filler neck the shape of the end portions of the tangs will urge the tang ends in the direction of the inclined ramps causing the tang ends to climb onto the inclined ramp surfaces.

Multiple tang element caps are known in contemporary positively or negatively pressurized tanks systems. In these embodiments initial cap rotation in the removal mode releases a first set of tangs from engagement with the host inclined ramps allowing the seal between the cap and the filler neck to be compromised. Further cap rotation in the same direction is necessary for the disengagement of the second set of tangs and the ultimate removal of the cap. These caps are not similar to the caps of the instant invention as they are unvented caps while the cap set forth herein is a vented cap that would be inefficient on pressure or vacuum dependent storage tanks.

SUMMARY OF THE INVENTION

A fluid tank cap has an external body portion that is ventilated to provide communication between the host tank interior and the external atmosphere. The cap is provided with two pairs of filler neck engaging tangs that sequentially engage and disengage. One set of tangs is provided with elongated portions having "propeller" or screw type tang ends that improve filler neck and cap alignment relationships upon installation of the cap on the filler neck.

The Applicant feels that the "propeller" shape of the tang ends of his cap is a distinctive construction that, in combination with the multiple tang design provides a cap that has advantages heretofor unavailable in agricultural tank caps.

Therefore it is among the objects of this invention to provide a fluid tank cap having a plurality of tang components for contacting inclined ramps inside a host filler neck.

Furthermore, it is an object of this invention to provide tangs for caps that improve cap alignment when the cap is positioned on the host filler neck.

These and other objects and advantages of the set forth cap design will be apparent from this disclosure when read in conjunction with review of the attached figures.

BRIEF DESCRIPTION OF THE DRAWINGS

The drawing figures illustrate an embodiment of the invention wherein:

FIG. 1 shows a broken away portion of a fluid tank and an embodiment of the cap of the instant invention;

FIG. 2 is a bottom view of a single tank cap of known configuration;

FIG. 3 is a bottom view of the cap of this invention;

FIG. 4 is a bottom view of the cap of FIG. 2 in position on a portion of a filler neck;

FIG. 5 of a bottom view of the cap of FIG. 3 in position on a portion of a filler neck;

FIG. 6 is a side elevation view of the cap of this invention as installed on a portion of a filler neck with portions of the cap and filler neck broken away;

FIG. 7 is a exploded component view of the cap of this invention;

FIG. 8 is a side elevation view of the spring tang of the invention.

DETAIL DESCRIPTION OF THE INVENTION

In the drawing figures like reference characters have been assigned to like parts on both the instant invention and the previously known cap.

FIG. 1 shows the general environment of a cap generally 10 in position on a filler neck 12 integral with a fluid tank 14. The fluid tank 14 is a container that typically incorporates, in addition to the filler neck opening, at least another aperture, for instance, a drain or a fluid exit port. The fluid tank is envisioned as being the type used on agricultural implements such as farm tractors and may be a fuel tank for a tractor for example.

The various drawing figures will be more readily understood if attention is directed to the FIG. 7 view. In this figure the various parts of the cap, generally 10, can be clearly seen. A cap shell 16 is formed which is a cylindrical member having an open end 18 and a domed and apertured end 20. Apertures such as 22 are provided as vent holes allowing communication between the inside of the cap shell 16 and the ambient atmosphere.

A plurality of apertured baffles such as first, second and third baffles 24, 26 and 28 respectively, all similar and interchangeable are fitted into the interior of the cap shell 16. Each baffle is a domed structure having relatively short side portions such as 30 and each also has a pair of apertures, one shown as 32 in the first baffle 24. The three baffles are inserted with the dome or convex side leading into cap shell 16. The first 24 and second 26 baffles are oriented such that the apertures 32 are rotated 90° from each other. The third baffle 28 will also have its apertures misaligned relative to the second baffle 28. The amount of rotation of each baffle is not critical, the idea being that the apertures not be aligned one over the adjacent one in the stack.

A platform is pressed into the interior of the cap shell 16 outboard from the first baffle 24. The platform 34 has a circumferential channel 36 at its cap shell contacting perimeter that defines a ventilated central portion 38 having a plurality of apertures including platform apertures 40 and small diameter apertures 42. The platform defines a circumferential space for accommodating a seal 44 that may be of a cork or elastomeric composition that would directly contact the top of the filler neck to provide a seal between the cap and the filler neck.

Two components are riveted (or otherwise fastened) by use of rivets, such as 46, to the platform 34. A secondary tang article 48 is the first of these. This initial tang member 48 has a base portion 50 with a plurality of apertures including a pair of small diameter apertures 52 and multiple perforations 54. The perforations 54 will be arranged, when the various components are fastened together, to allow communication of air through the platform apertures 40. The short sidewalls 56 project from the plane of the initial base portion 50 of the tang member. The sidewalls include a pair of bent over tabs such as 58 that extend at relatively right angles outwardly from the short sidewalls 56 at diametrically opposite sides of the secondary tang. These two bent over tabs 58 comprise first and second secondary tangs that will engage the inclined internal ramps of the tank filler neck. Diametrically opposite cutouts 60 are provided in the short sidewalls 56.

The primary or spring tang 62 is fastened to the secondary tang 48 and the platform 34 through the expedient of the rivets 46 passing through spring tang apertures, one being 64, the small apertures in the secondary tang 52 and the small diameter apertures 42 in the platform 34. Other fastening means are equally serviceable such screws, bolts, or spot welding.

The spring tang 62 is a generally flat plate with first 66 and second 68 end portions with each of the end portions having pitched guide surface inclines giving the end portions a "propeller" shape. The length of the spring tang 62 from end portion 66 to end portion 68 is greater than the outside diameter of the secondary tang 48. The end portions of the spring tang project outwardly through the diametrically opposite cutouts 60 of the secondary tang 48.

In FIG. 8—a side elevation view taken through 8—8 of FIG. 7—the end view of the spring tang 62 shows the radically inclined tang ends 66 and 68 in the foreground with a flat 70 raised slightly above the normal plane of the spring tang 62. An inclined engagement guide ramp 72 is connected to the main portion of the spring tang 62 while inclined approximately 30° from the normal horizontal plane of the spring tang. Both the flat 70, which is attached to the guide 72 at point 74, and the guide ramp 72 are melded into the main portion of the spring tang at and through transition areas 76 and 78. Notice that the end portions 66 and 68 are not continuous curve concave elements as are well known in the prior art but are rather the bi-planar configuration as shown in FIG. 8.

Returning to the figures notice that in the prior art cap shown as FIG. 2 and FIG. 4 the cap shell 16 provides a housing for platform 80 to which a conventional tang 82 is mounted. The conventional tang 82 has conventional end portions such as 84 which are curved to be concave in the view shown. That is, each tip 86 and 88 of each end 84 would have the same elevation in a side elevation view. This differs from the flat 70 and inclined engagement guide ramps 72 of the instant invention as previosly described.

In FIGS. 4 and 5 the prior art cap (FIG. 4) and the cap of the instant invention (FIG. 5) are both shown inserted and partially screwed into a tank filler neck 90. The view would be looking from inside the tank up the filler neck 90 to the cap end. The filler neck has inwardly bent extremities that provide a sealing surface for contacting the seal 44 of the cap and also extends back down a short distance into the interior of the filler neck to provide inclined ramps 92 or surfaces that allow tightening of the cap onto the filler neck. Each ramp 92 will also incorporate tang stops 94 that prevent the cap from being screwed on too far, that is, so far that the tangs go into the open area just before the start of the ramp surfaces. The difference between the caps is apparent in these two comparison views—the improved cap of the isntant invention has the spring tangs 68 with the flat 70 and the inclined engagement guide ramps 72 as well as the bent over tabs 58.

The significance of FIGS. 4 and 5 is that the posssible misalignment of the conventional caps can readily be seen. Both embodiments show the cap just after it has been put in position and turned only several degrees. Notice in FIG. 4 that only the tang on the left side of the figure has been positioned on the inclined ramp 92. The other tang is inboard of the ramp 92 (on the right side) and will not engage the proper surface of the ramp. It will only continue to ride relatively inside the ramp 92 while the fully engaged tang on the left side rides up its respective ramp. The cap will not be held on as securely as it would have been if both tangs had properly ridden up the inclined ramps 92. The instant invention is directed toward improving this problem alignment through the use of the specially shaped tang ends.

In FIG. 5 the cap is properly centered in the filler neck but if it were not the tang end that would be contacting the interior surface of the inclined ramp would tend to "screw" itself relatively downward in the filler neck until the tang got up to the inclined ramp whereupon it would climb onto the ramp.

Bent over tabs 58 also will engage the inclined ramp surfaces upon cap installation and will provide for a two step sequential removal process.

FIG. 6 shows the cap installed on a portion of a filler neck with part of the cap and the filler neck broken away. In this view the orientation of the various parts can be easily seen. Of importance are the filler neck 90, the inclined ramp 92, the spring tang 68, the secondary tang 48 with its bent over tab 50 and the platform 34.

Thus it can be seen that there has been provided an improved fluid tank filler cap that provides the objects and advantages of the instant invention. Nuances of engineering design are contemplated by the inventor while the appended claims intend to embrace all such alternatives, modifications and variations as fall within the spirit and scope of the claimed invention.

What is claimed is:

1. In a container cap for use in covering a filler neck of said container said cap comprising:
   a cap shell having a cylindrical member having an open end and an apertured integral domed end;
   a plurality of apertured baffles including a first baffle carried in the interior of said cap shell;
   a platform carried in the interior of said cap shell in proximity to the open end of said cap shell adjacent said first baffle, said platform having a circumferential channel at its cap shell contacting parameter, said circumferential channel defining a central portion having a plurality of apertures including a pair of small diameter apertures;
   a secondary tang member having a base portion with a plurality of apertures including a pair of small diameter apertures; said secondary tang members's base portion in contact with and attached to said central portion of said platform; and
   a spring tang attached to said secondary tang member, said spring tang being a generally flat plate have a pair of apertures and first and second end portions, said end portions having inclined engagement guide ramps with said inclines sloping upwardly to a flat portion of said end portions.

2. The invention in accordance with claim 1, wherein said plurality of apertured baffles includes:
   a first baffle being a cup shaped member having sidewalls extending from a concave end dome, said concave end dome having at least a single aperture through said dome;
   second and third baffles each being cup shaped members having sidewalls extending from respective concave end domes, said concave end domes having at least a single aperture through said dome, said single aperture of said second dome offset relative to said single aperture of said first dome and said third baffle dome.

3. The invention in accordance with claim 1, wherein said secondary tang member has sidewalls extending from said base portion of said tang member and first and second secondary tangs formed on said sidewalls at diametrically opposite positions.

4. The invention in accordance with claim 1, wherein said spring tang length is greater than the diameter of said secondary tang members whereby said spring tang extends outboard of said base portion of said secondary tang.

5. The invention in accordance with claim 4, wherein said spring tang is a flat plate having first and second end portions with inclined engagement guide ramps connected to said flat plate and to said flats at an intermediate point, both said inclined engagement guide ramps and said flats are melded into said flat plate of said spring tang.

6. The invention in accordance with claim 5, wherein said inclined engagement guide ramps are inclined at approximately thirty degrees from the normal horizontal plane of said spring tang.

7. In a container cap for use in covering a filler neck of said container said cap comprising:
   a cap shell being a cylindrical member having an open end and an apertured integral domed end;
   a first baffle being a cup shaped member having sidewalls extending from a concave end dome, said concave end dome having at least a single aperture through said dome;
   second and third baffles each being cup shaped members having sidewalls extending from respective concave end domes, said concave end domes having at least a single aperture through said dome, said single aperture of said second dome offset relative to said single aperture of said first dome and said third baffle dome;
   a platform carried in the interior of said cap shell in proximity to the open end of said cap shell adjacent said first baffle, said platform having a circumferential channel at its cap shell contacting perimeter, said circumferential channel defining a central portion having a plurality of apertures including a pair of small diameter apertures;
   a secondary tang member having a base portion with a plurality of apertures including a pair of small diameter apertures, sidewalls extending from said base portion of said tang member and a first and a second secondary tang formed on said sidewalls at diametrically opposite positions;
   a secondary tang member having a base portion with a plurality of apertures including a small diameter aperture, sidewalls extending from said base portion of said tang member and a first and a second secondary tang formed on said sidewalls at diametrically opposite positions;
   a spring tang being a flat plate having first and second end portions with inclined engagement guide ramps connected to said flat plate and to said flats at an intermediate point both of said inclined engagement guide ramps and said flats are melded into said flat plate of said spring tang; and
   a fastening means fastening said secondary tang member to said platform and said spring tang to said secondary tang member.

8. The invention in accordance with claim 7, wherein said spring tang inclined engagement guide ramps are inclined at approximately thirty degrees from the normal horizontal plane of said spring tang.

* * * * *